United States Patent [19]

Grasshoff

[11] 4,350,801

[45] Sep. 21, 1982

[54] PROCESS FOR PREPARING POLYMERIC OXIMES

[75] Inventor: Michael J. Grasshoff, Hudson, Mass.

[73] Assignee: Polaroid Corporation, Cambridge, Mass.

[21] Appl. No.: 239,158

[22] Filed: Feb. 27, 1981

[51] Int. Cl.$^3$ .................... C08F 220/60; C08F 220/34
[52] U.S. Cl. .................................. 526/93; 526/234; 526/236; 526/238; 526/307; 526/311
[58] Field of Search ................ 526/307, 311, 93, 234, 526/236, 238

[56] References Cited

U.S. PATENT DOCUMENTS

| | | | |
|---|---|---|---|
| 2,962,477 | 11/1960 | Blanchette | 525/339 |
| 3,261,817 | 7/1966 | Angelo | 526/311 |
| 3,268,480 | 8/1966 | Wagenaar et al. | 526/311 |
| 3,293,216 | 12/1966 | Koral | 525/326 |
| 3,454,669 | 7/1969 | Laudise | 528/120 |
| 3,730,891 | 5/1973 | Riccitiello et al. | 526/311 |
| 3,963,791 | 6/1976 | Giuffre et al. | 526/22 |
| 4,085,261 | 4/1978 | Patchornik et al. | 526/19 |
| 4,202,694 | 5/1980 | Taylor | 430/215 |
| 4,256,614 | 3/1981 | Taylor | 260/17 A |
| 4,276,370 | 6/1981 | Taylor | 526/311 |

FOREIGN PATENT DOCUMENTS 622821  9/1978  U.S.S.R. .

OTHER PUBLICATIONS

B. A. Zaitsev et al., Vysokomol. sayed. A10 No. 2, pp. 438–445.
Honge et al., Journal of Polymer Science: Polymer Chemistry Edt. vol. 12, 2553–2566 (1974).
Masuda et al., Polymer Journal, vol. 10, No. 4, pp. 397–402 (1978).
N. G. Koral'nik et al., Applied Chemical Journal of the U.S.S.R., vol. 36, p. 1569, (1963).

*Primary Examiner*—Harry Wong, Jr.
*Attorney, Agent, or Firm*—Louis G. Xiarhos

[57] ABSTRACT

A process for preparing high molecular weight polymeric ketoximes and aldoximes is disclosed which comprises providing a solution of a monomeric ketoxime or aldoxime in an aqueous acidic solvent system, the solution having a pH of up to about pH 1.5, and polymerizing the dissolved monomeric ketoxime or aldoxime in the presence of an aqueous acid-soluble polymerization initiating agent.

31 Claims, No Drawings

PROCESS FOR PREPARING POLYMERIC OXIMES

BACKGROUND OF THE INVENTION

This invention relates to a process and, in particular, to a process for preparing polymeric ketoximes and aldoximes.

Polymeric ketoximes and aldoximes are known. These materials may be characterized as polymers comprising recurring units which comprise an oxime moiety of the formula

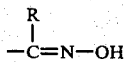

wherein R is hydrogen, alkyl, or aryl, including substituted alkyl or aryl. Generally, such polymers have heretofore been prepared by polymerizing a monomer containing a reactive keto or formyl group and reacting the resultant polymer, i.e., the keto or formyl groups in the resultant polymer, with hydroxylamine. High molecular weight polymeric oximes, e.g., polymeric oximes having a molecular weight of 50,000 or greater, normally have been prepared by this method.

The preparation of certain polymeric oximes by the method of polymerizing a monomeric oxime has been disclosed. A series of publications by Masuda et al. in Polymer Journal, Vol. 11, No. 8, pp. 641-649 (1979); Vol. 11, No. 3, pp. 213-218 (1979); Vol. 10, No. 4, pp. 397-402 (1978); and in publications referenced therein, discloses the polymerization of acrolein oxime in organic solvent systems employing various means of initiating the polymerization reaction. The molecular weights of the polymers obtained were reported to be very low, generally about 1000-3000. The copolymerization of p-vinylacetophenone oxime with styrene and methylmethacrylate and p-isopropenylacetophenone oxime with styrene using ethyl alcohol or alcohol-benzene as a solvent is reported by B. A. Zaitsev and G. A. Shtraikhman in Vysokomol. soyed., A 10: No. 2, 438-445, (1968), English translation at page 511. Molecular weights of the resultant polymers are not reported. U.S. Pat. No. 4,202,694, issued May 13, 1980 to L.D. Taylor, refers to certain unsuccessful attempts to prepare high molecular weight polymers by polymerization of monomeric oximes.

SUMMARY OF THE INVENTION

According to the present invention, a process has been discovered whereby certain monomeric ketoximes and aldoximes can be polymerized to provide high molecular weight polymeric ketoximes and aldoximes. The process of this invention comprises the steps of providing a solution of a monomeric oxime of the formula

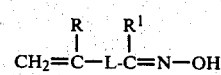

wherein R is hydrogen or lower alkyl, $R^1$ is hydrogen, lower alkyl, aryl, aralkyl or alkaryl, and L is a divalent organic linking group, in an aqueous acidic solvent system, the solution having a pH of up to about 1.5; and polymerizing the monomeric oxime dissolved in the aqueous acidic solvent system in the presence of an aqueous acid-soluble polymerization initiating agent.

In a preferred aspect of this invention, the monomeric ketoxime or aldoxime is of the formula

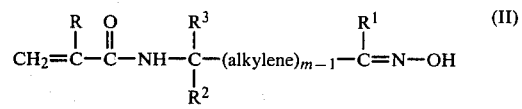

wherein R and $R^1$ are as previously defined, each of $R^2$ and $R^3$ is independently lower alkyl having 1-6 carbon atoms, the alkylene moiety has 1-8 carbon atoms, and m is an integer of one or two.

The high molecular weight polymeric oximes prepared in accordance with the present invention can be employed, for example, as viscosity-increasing reagents in aqueous alkaline photographic processing compositions.

For a fuller understanding of the present invention, reference should be had to the following detailed description.

DETAILED DESCRIPTION OF THE INVENTION

The present invention relates to a process whereby monomeric ketoximes and aldoximes are employed to prepare high molecular weight polymeric ketoximes and aldoximes, i.e. high molecular weight polymers having ketoxime or aldoxime moieties pendant to the polymer backbone. For purposes of brevity and convenience, the monomeric ketoximes and aldoximes employed in this invention are hereinafter referred to simply as monomeric oximes and, similarly, the polymeric ketoximes and aldoximes produced in accordance with the present invention are hereinafter referred to simply as polymeric oximes. The process of this invention comprises the steps of providing a solution of a monomeric oxime of the formula

wherein R is hydrogen or lower alkyl, e.g., methyl, ethyl, isopropyl; $R^1$ is hydrogen, lower alkyl, e.g., methyl, ethyl, isopropyl; aryl, e.g., phenyl; alkaryl, e.g., tolyl; or aralkyl, e.g., benzyl; and L is a divalent organic linking group, in an aqueous acidic solvent system, the solution having a pH of up to about 1.5; and polymerizing the monomeric oxime dissolved in the aqueous acidic solvent system in the presence of an aqueous acid-soluble polymerization initiating agent.

The monomeric oxime solution can be provided by addition of the monomeric oxime to an aqueous solvent system and thereafter adjusting the pH to the desired level by addition of acid. However, such a procedure may expose the monomeric oxime to intermediate acidic pH levels, e.g., pH levels in the range of about 1.6 to about 6.0, for an unacceptable period of time such that hydrolysis of the oxime function to the corresponding ketone or aldehyde may occur. Accordingly, in a preferred practice the monomeric oxime is added to an aqueous acidic solvent system comprising a sufficient amount of acid such that the pH of the resultant solution is at the desired level. In general, the pH of the aqueous acidic solvent system will increase upon dissolution of the monomeric oxime. The initial pH of the solvent system should be sufficiently low as to accommodate such an increase and permit formation of a solution having the desired pH.

The pH of the monomeric oxime solution may vary from negative pH levels up to about pH 1.5. While not wishing to be bound by any particular theory, it is believed that conduct of the present process is permitted by reason of the monomeric oxime undergoing protonation at the pH levels employed herein to provide a protonated monomeric species capable of undergoing the desired polymerization. Accordingly, the monomeric oxime solution pH levels employed herein should be at or, preferably, below the pH level at which the monomeric oxime undergoes such protonation. Certain monomeric oximes of the formula (I) may undergo protonation at pH levels of up to about pH 1.5. Accordingly, the pH employed in the present process can be up to about pH 1.5. Generally, however, monomeric oximes of formula (I) will undergo protonation at pH levels below pH 1.0. Employment of pH levels below the pH at which the monomeric oxime undergoes protonation is preferred in order to ensure protonation of essentially all of the monomeric oxime. In addition, as noted hereinafter, such pH levels are preferred insofar as they aid in maintaining the polymeric product as a protonated species during the course of the polymerization reaction.

Suitable monomeric oxime solution pH levels can be determined empirically. Protonation of the monomeric oxime may be evidenced by, for example, an increase in the pH of the aqueous acidic solvent system upon dissolution of the monomeric oxime, an increase in the solubility of the monomeric oxime as compared to its solubility at higher pH levels, and ultimately by production of the desired polymers.

Protonation is believed to occur at the oxime function of the monomer so as to produce a species of the formula

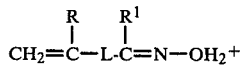

The protonation may provide increased solubilization of the monomeric oxime such that it can be dissolved in sufficient concentration as to permit facile polymerization. In addition, protonation apparently stabilizes the oxime function such that acid hydrolysis thereof in the highly acidic solvent system to the corresponding ketone or aldehyde is minimal or essentially non-occurring and provides a species, i.e., the protonated monomeric oxime, capable of undergoing polymerization to produce high molecular weight polymers.

It is believed that the polymerization reaction of this invention involves polymerization of a protonated monomeric oxime to provide a protonated polymeric oxime. Reference herein to polymerization of the monomeric oxime is, accordingly, intended to be inclusive of the polymerization of the protonated species and, similarly, reference herein to preparation of a polymeric oxime is intended to be inclusive of the preparation of the protonated polymeric species.

It is preferred that the protonated polymeric oxime be maintained as such, i.e., not undergo deprotonation, prior to completion of the polymerization reaction. Thus, the pH of the reaction system, in addition to being at or below the pH level at which the monomeric oxime undergoes protonation, is preferably also at or below the pH level which is sufficient to maintain the polymeric oxime as a protonated species. A pH level sufficient to effect protonation of the monomeric oxime may also be sufficient to maintain the polymeric oxime as a protonated product. However, such a pH level may not be sufficient if the polymeric oxime is a weaker base than the corresponding monomeric oxime, such that it may be necessary to employ a lower pH level to maintain protonation of the polymer.

Maintenance of the polymeric oxime as a protonated species during the polymerization is generally beneficial in that the protonated polymer tends to be more soluble than the deprotonated polymer and, thus, has less of a tendency to precipitate prematurely from the solvent system. Such premature precipitation may complicate termination of the polymerization and result in complex branched or cross-linked polymer. In addition, protonation of the polymeric oxime apparently stabilizes the pendant oxime function of the polymer to acid hydrolysis in a manner similar to that mentioned above with regard to the protonated monomer. Thus, hydrolysis of the oxime function of the protonated polymer is minimal or essentially non-occuring.

It will be understood that the adequacy of a particular pH level for conduct of the present process may be determined empirically by relatively simple experimentation, e.g., by adjusting the pH level downward until the monomeric oxime is satisfactorily dissolved and protonated or until the polymeric product is maintained as a protonated species.

It will be appreciated that accurate measurement of pH values below about 1.0 may prove difficult and that, as a result, it may be desirable to characterize the solvent system as having a weight or volume percent of acid rather than a particular pH value. Generally, it is sufficient that the concentration of acid be such as to effect the present process in a satisfactory manner. Accurate measurement of pH values below about 1.0 is not a critical requirement.

The acid component of the aqueous acidic solvent system can comprise any strong acid capable of providing a pH sufficiently low to permit conduct of the present process. Strong organic acids which are soluble in water, such as p-toluene sulfonic acid, may be employed. Preferably, the acid utilized is a strong mineral acid such as hydrochloric acid, nitric acid, or sulfuric acid.

The aqueous acidic solvent system comprises water and may comprise one or more water-miscible co-solvents, e.g., any of the various alcohols such as methanol, ethanol, and isopropanol or other water-miscible co-solvents such as dimethylformamide and dimethylsulfoxide. It will be appreciated that water-miscible co-solvents employed in the practice of this invention should be substantially stable at the pH and temperature of the reaction medium and substantially non-reactive with the reactants and products of the reaction. Generally, the monomeric oxime, and any comonomers employed to produce copolymeric oximes, may be added to the aqueous solvent system in a ratio or monomer or comonomers to aqueous solvent of about 1:1 to about 1:50 on a weight basis, with ratios in the range of about 1:2 to about 1:10 being preferred. It is also preferred that the monomeric oxime and any comonomers be initially completely dissolved in the aqueous acidic solvent system. It will be understood, however, that these materials need not be completely dissolved in the solvent system for conduct of the present process. A portion of such materials may remain undissolved or dissolve gradually during the course of the polymerization without deleteriously affecting the production of the desired polymers.

As indicated above, the monomeric oxime dissolved in the aqueous acidic solvent system is polymerized in the presence of an aqueous acid-soluble polymerization initiating agent. The polymerization is generally effected by introducing the initiating agent into the monomeric oxime solution and maintaining the resultant solution under conditions of time and temperature sufficient to permit formation of the desired polymers. Temperatures within the range of about 0° C. to about 70° C. may be utilized in the polymerization reaction, with the optimum reaction temperature being dependent on such factors as the amount and type of polymerization initiating agent, the particular monomeric oxime employed, the solubility of the monomeric oxime, the reaction rate, and the stability of the monomeric oxime in the aqueous acidic solvent system. Notwithstanding the above-mentioned relative acid stability of the protonated monomeric and polymeric oximes, as compared to the unprotonated species, it is preferred to employ reaction temperatures of less than about 45° C. so as to ensure minimization of acid hydrolysis. A particularly preferred range of temperatures is about 20° C. to about 40° C., the reaction generally proceeding with facility in this temperature range to produce high molecular weight polymers in a relatively short period of time, e.g., about 5 to 30 minutes. The reaction time generally should not be extended beyond that necessary to obtain an optimum molecular weight inasmuch as increased exposure of the oxime moiety to the aqueous acidic solvent system may tend to increase the degree of hydrolysis thereof.

As used herein, the term "polymerization initiating agent" refers to any material or combination of materials which initiates or catalyzes the polymerization reaction of this invention. The initiating agent should be soluble in the aqueous acidic solvent system at least to an extent sufficient to permit initiation and maintenance of the polymerization reaction. Any suitable aqueous acid-soluble polymerization initiating agent may be employed in the practice of this invention. Preferred initiating agents are the redox initiators, i.e., polymerization initiators comprising a combination of an oxidizing agent and a reducing agent which is capable of reaction with the oxidizing agent. Redox combinations suitable for use as polymerization initiators are well known in the art. Reference may be had, for example, to the publication of R. G. R. Bacon, Trans. Faraday Soc., 42, 140 (1946) wherein is described a variety of oxidizing and reducing agents suitable for employment in redox initiating combinations. It will be appreciated that any redox combination useful in promoting the polymerization of a monomeric oxime in accordance with the present invention may be employed herein. Oxidizing agents which may be employed herein include peroxides, such as hydrogen peroxide, and alkali persulfates such as ammonium persulfate, potassium persulfate, and sodium persulfate. Reducing agents which may be employed in the practice of this invention include salts, particularly sulfate salts, comprising a metal cation capable of undergoing oxidation, e.g., cuprous sulfate, ferrous sulfate, and hydrates thereof. Other reducing agents which may be employed include the various sulfites; bisulfites; metabisulfites; hydrosulfites; sulphoxylates; and thisoulfates. A redox combination found to be particularly useful in the present invention is a combination of ferrous sulfate and ammonium persulfate. Thus, as indicated in Examples 2 through 4 hereinafter, an approximately 1:1 molar ratio of ferrous sulfate heptahydrate and ammonium persulfate was found to promote the polymerization reaction with facility to produce high molecular weight polymers.

In conducting the process of this invention employing a redox combination, separate aqueous solutions of the oxidizing agent and reducing agent can be prepared and added to the monomeric oxime solution in separate streams or the solid oxidizing and reducing agents can be added without being first dissolved.

In general, the present invention may be practiced employing less than about 5% by weight of initiating agent, based on the weight of starting monomer(s). The particular amount and concentration of initiating agent can depend, for example, on the efficiency of the agent, the stability of the agent under the operative reaction conditions, the particular monomeric oxime employed, and the intended molecular weight of the product polymer. Generally, the minimum weight of initiating agent which is sufficient to sustain the reaction (usually less than 1% by weight based on the weight of starting monomer(s)) will be preferred, such minimum amount of initiating agent generally tending to promote formation of higher molecular weight polymeric oximes.

Protonated polymeric oximes produced by the present process may be neutralized to provide the "free" oxime polymer. As indicated previously, neutralization during the polymerization reaction may occur if the pH of the reaction system is insufficient to maintain protonation of the polymer. In general, however, it is preferred to maintain the polymer as a protonated species during the course of the polymerization and thereafter neutralize the protonated polymer by upward adjustment of the pH of the reaction solution to a level equal to or, preferably, above the level at which the protonated polymer undergoes deprotonation. As indicated previously, the pH of the reaction solution can vary from negative pH levels up to about pH 1.5. The pH level at which the polymer undergoes deprotonation will also vary, depending on the particular protonated polymeric oxime. In general, upward adjustment of the pH to a level within the range of about 0.5 to 2.0 should function to effect neutralization of the protonated polymer. The pH can be upwardly adjusted by various means such as adding the polymerization reaction solution to water or to an aqueous solution of a water-soluble base, preferably a mild base such as sodium bicarbonate. Generally, the neutralization is evidenced by precipitation of the polymer, i.e., the "free" oxime polymer, from the medium obtained as a result of pH adjustment. Thus, the neutralization may involve upwardly adjusting the pH of the reaction solution to a level sufficient to effect formation of a precipitate of the polymeric oxime, e.g., adding the reaction mixture to a sufficient amount of water or a sufficiently concentrated aqueous solution of a water-soluble base such that precipitation of the polymer is effected. The precipitated polymer may be separated from the resultant medium by conventional means, e.g., centrifugation or filtration.

The oxime function of the "free" polymeric oxime will be understood to be substantially more prone to acid hydrolysis than in the protonated polymer. Accordingly, it is preferred that the environmental pH of the "free" polymeric oxime be upwardly adjusted to a level at which acid hydrolysis of the pendant oxime function is essentially non-occurring. Such adjustment of the environmental pH may be accomplished in conjunction with the above-described neutralization by upwardly adjusting the pH to a level which is not only sufficient to effect neutralization but which is also sufficiently high such that acid hydrolysis of the "free" oxime function of the polymer is essentially non-occurring. Thus, the polymerization reaction mixture can be added to a sufficient amount of water or a sufficiently strong base solution such that the pH is upwardly adjusted to a level at which acid hydrolysis is essentially non-occurring. Alternatively, if the "free" polymeric oxime precipitates upon neutralization, e.g., in the pH range of about 0.5 to about 2.0, the environmental pH of the polymer may be adjusted by filtering the polymer and washing it until the pH of the wash-filtrate is upwardly adjusted to the desired level. In a particularly preferred practice, the environmental pH of the polymer is brought to a level above 6.0.

The polymeric oximes produced by the process of this invention can be homopolymers or copolymers. In accordance with the present invention, copolymers can be prepared by copolymerization of a monomeric oxime of formula (I) with either a second ethylenically unsaturated copolymerizable monomeric oxime or one or more copolymerizable ethylenically unsaturated "non-oxime" monomers. Copolymerization is effected by dissolving the ethylenically unsaturated comonomer(s) in the aqueous acidic solvent system together with a monomeric oxime of formula (I). The respective monomers may be added to the aqueous acidic solvent system simultaneously or sequentially. It will be appreciated that comonomers useful in the present invention are those which are soluble in the aqueous acidic solvent system at the reaction temperature to an extent sufficient to permit the intended copolymerization and which are satisfactorily stable to the acidic solvent system at such temperature. "Non-oxime" comonomers which may be employed in the present invention include N-alkylacrylamides, N,N-dialkylacrylamides, and ethylenically unsaturated acids having at least slight solubility in water. Specific mention may be made of N,N-dimethylacrylamide, N,N-dimethylmethacrylamide, diacetoneacrylamide, 2-acrylamido-2-methylpropane sulfonic acid, acrylic acid, and methacrylic acid.

Copolymerization may be employed in the present invention to effect production of polymers having predetermined properties rendering them especially suitable for a particular purpose. For example, it is disclosed in previously referenced U.S. Pat. No. 4,202,694 that copolymers of diacetone acrylamide oxime and acrylic acid exhibit desirable solubility, viscosity, and stability properties in aqueous alkali, which properties render the copolymers particularly suitable for employment as viscosity-increasing reagents in aqueous alkaline photographic processing compositions. In accordance with the present invention, such copolymers of high molecular weight can be prepared by the copolymerization of diacetoneacrylamide oxime and acrylic acid.

It should be understood that the various properties which may be imparted to the polymeric oxime by employment of "non-oxime" comonomers can result from the particular nature of the comonomer, e.g., the comonomer may contain a solubilizing group, or from the decrease in the proportion of oxime moieties along the polymer backbone as compared to, for example, the homopolymeric oxime, which decrease is inherently resultant from incorporation of the "non-oxime" comonomer into the polymer.

The divalent organic linking group L of formula (I) can be any divalent organic group which is stable under the conditions of the present process and which does not deleteriously affect the conduct of the present process. The linking group L can be selected from the group consisting of arylene, preferably containing from 6 to 10 carbon atoms such as phenylene, naphthylene and the like; arylenealkylene wherein the point of attachment to the oxime moiety is at a site on the alkylene moiety to provide, e.g.,

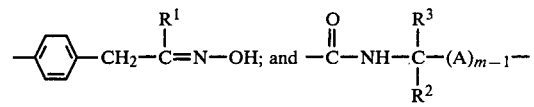

wherein each of $R^2$ and $R^3$ is independently hydrogen or lower alkyl having 1 to 6 carbon atoms, A is alkylene, preferably containing 1 to 8 carbon atoms such as methylene, ethylene, isopropylene, and the like, arylene, or arylenealkylene, and m is an integer 1 or 2. Monomeric oximes preferred for use in the present invention are those of formula (I) wherein the linking group L is

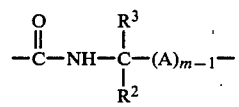

wherein each of $R^2$ and $R^3$ is independently lower alkyl having 1 to 6 carbon atoms, m is an integer 1 or 2, and A is alkylene having from 1 to 8 carbon atoms such that the preferred monomeric oximes are of the formula

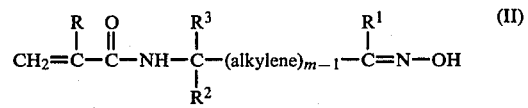

wherein R and $R^1$ are as previously defined. Polymers which can be produced by employment of monomeric oximes of formula (II) in the present process are high molecular weight polymers comprising recurring units of the formula

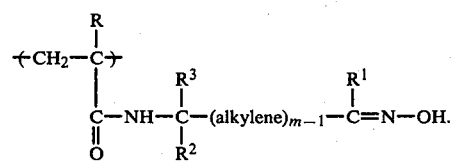

As disclosed in U.S. Pat. No. 4,202,694, such polymers are particularly useful as viscosity-increasing reagents in aqueous alkaline processing compositions.

Monomeric oximes which may be employed in the practice of this invention include those of the following formulas:

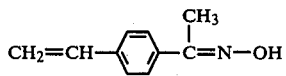

$$R_2C=O + NH_2OH \rightarrow R_2C=N-OH + H_2O$$

This method of preparing oximes is well known in the art and does not per se constitute a part of this invention.

If desired, the polymerization reaction can be conducted in the absence of oxygen by deaeration or replacement of oxygen with nitrogen or some other suitably inert gas. However, such a procedure is not generally necessary. Good results will normally be obtained without deaeration or purging of oxygen from the reaction system.

As mentioned previously, the high molecular weight polymerix oximes prepared by the process of this invention may be employed as viscosity-increasing reagents in photographic processing compositions. Of particular interest is the employment of the polymers for such purpose in processing compositions intended for use in color diffusion transfer systems wherein a color image is formed which is viewable without separation of any of the components or layers of the photographic product. The polymers prepared in accordance with this invention may be especially useful in such color diffusion transfer processing compositions comprising a pigment, e.g., titanium dioxide, the polymeric oxime tending to aid in keeping such materials uniformly dispersed throughout the composition. Disclosure relating to the employment of high molecular weight polymeric oximes as viscosity-increasing reagents in photographic processing compositions may be found in U.S. Pat. No. 4,202,694, issued May 13, 1980 to Lloyd D. Taylor.

The present invention is further illustrated in the following Examples which are illustrative only and not intended to be of limiting effect.

EXAMPLE 1

Preparation of diacetone acrylamide oxime

To a solution of 408 g. (2.4 moles) of diacetone acrylamide

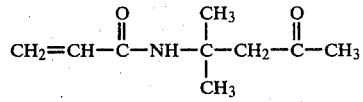

and 200 g. (2.88 moles; 20% molar excess) of hydroxylamine hydrochloride in 1.5 l. of distilled water was added a solution of 200 g. (1.44 moles) of potassium carbonate in 250 ml. of water at room temperature of about 25° C. over a period of 15 min. A precipitate formed after about 15 minutes. Stirring was continued until a thick paste formed and the mixture was then allowed to stand for another hour. The solid product was isolated by filtration, washed with small portions of water (amounting to a total of 500 ml.) and dried at 40° C. in a vacuum oven. Yield of 365 g. of a white crystalline powder (82% yield), m.p. 103° C. The material was of sufficient purity to be directly employed in polymerization and was employed in the polymerization described in Example 2 hereinafter. If desired, further purification can be attained through recrystallization from benzene or toluene.

EXAMPLE 2

Four grams of diacetone acrylamide oxime prepared by the procedure described in Example 1 were dis-

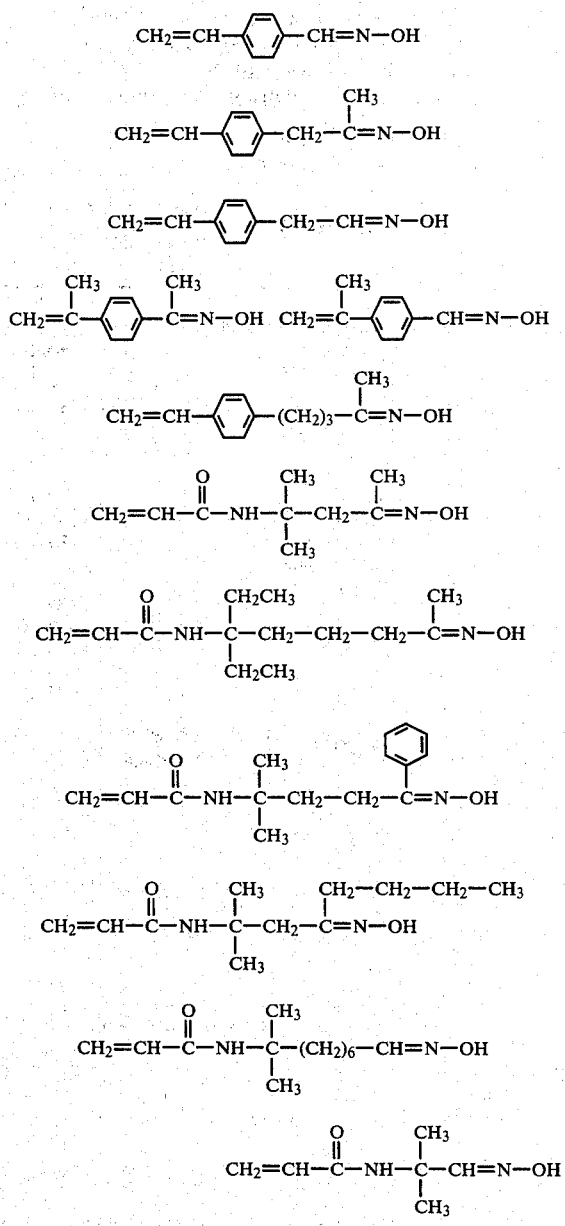

With regard to the monomeric oximes of formula (II), the process of the present invention is especially suited to the production of polymers from diacetone acrylamide oxime:

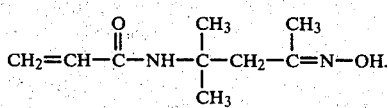

Homopolymers and copolymers of diacetone acrylamide oxime can be prepared in accordance with the present process.

In general, the monomeric oximes employed as the starting materials of the present process may be prepared by reaction of the corresponding precursor ketone or aldehyde with hydroxylamine, i.e.,

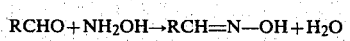

$$RCHO + NH_2OH \rightarrow RCH=N-OH + H_2O$$

solved in 12 g. of 20% by weight aqueous sulfuric acid. The pH of the solvent system, as measured by an Orion Research analog pH meter Model 301, rose from a negative pH level to a pH of about 0.4 upon dissolution of the oxime. A stream of nitrogen was bubbled through the solution for about 10 minutes and, under a nitrogen atmosphere, 0.013 g. of ferrous sulfate heptahydrate in 0.5 ml. of water and 0.01 g. of ammonium persulfate in 0.3 ml. of water were added at ambient temperature of about 25° C. The solution became viscous immediately and the temperature rose from about 25° C. to about 32° C. After stirring for about 30 minutes, the reaction mixture was added to 300 ml. of water resulting in formation of a precipitate. The pH of the resultant mixture was about pH 1.0. The precipitate was filtered, washed with water until the pH of the wash-filtrate was about pH 7.0, and dried. Yield of 2.5 g. of high molecular weight poly-diacetoneacrylamide oxime. Infrared spectrometric analysis indicated a minimal amount of hydrolysis of the oxime function (estimated at less than about 3% of the oxime functions in the polymer) as detected by the presence of a weak band at 1705 cm.$^{-1}$.

EXAMPLE 3

8.1 g. of diacetone acrylamide oxime (0.044 mole) prepared by the procedure described in Example 1 and 0.35 g. of acrylic acid (0.0048 mole) were added with stirring to a mixture of 6 ml. of 37% by weight hydrochloric acid (about 0.072 mole of HCl) and 13 ml. of water which had been purged with nitrogen for 20 minutes. A clear solution resulted which had a pH of about 0.4 as measured by the Orion Model 301 pH meter. At room temperature of about 25° C., under a nitrogen atmosphere, 0.015 g. of ferrous sulfate heptahydrate was added followed, about 3 minutes later, by addition of a solution of 0.014 g. of ammonium persulfate in 1.0 ml. of water. The ammonium persulfate was added dropwise over a period of about 10 minutes during which time the temperature of the solution rose from about 27° C. to about 39° C. The solution was stirred an additional 10 minutes and then poured into 150 ml. of water, precipitating the copolymer as a white precipitate. The pH of the resultant mixture was measured at about 0.8. The precipitated copolymer was filtered and washed with a total of 200 ml. of water. The pH of the last portion of water was about 7.0. The copolymer was of a high molecular weight and had an infrared absorption spectrum which was essentially identical with that of a high molecular weight copolymer of diacetone acrylamide oxime and acrylic acid prepared by copolymerization of diacetone acrylamide and acrylic acid in a 10:1 molar ratio followed by oximation of the copolymer.

EXAMPLE 4

One gram of 4-vinylacetophenone oxime

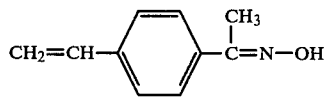

was dissolved in 10 g. of 50% by weight aqueous sulfuric acid. The pH of the solution was below levels measurable on the Orion pH meter. To the solution were added 0.002 g. of ferrous sulfate heptahydrate and 0.002 g. of ammonium persulfate. After about 5 minutes the temperature of the system had risen from about 30° C. to about 35° C. and the solution had become very viscous. After 10 additional minutes, the solution was added to 50 ml. of water effecting precipitation of the poly-4-vinylacetophenone oxime. The polymer was filtered, washed repeatedly until the pH of the wash-filtrate was about pH 7.0, and dried. Yield of 0.8 g. of high molecular weight polymer.

EXAMPLE 5

A color diffusion transfer processing composition was prepared comprising the following ingredients:

| | |
|---|---|
| Water | 244.8 g. |
| Poly-diacetone acrylamide oxime prepared as in Example 2 | 4.8 g. |
| Potassium hydroxide (45% w/w aqueous solution) | 70.2 g. |
| Titanium dioxide | 347.0 g. |
| Benzotriazole | 3.3 g. |
| 4-aminopyrazolo(3,4d)pyrimidine | 1.5 g. |
| 6-methyluracil | 1.8 g. |
| N-(β-hydroxyethyl)-N,N′,N′-tris-carboxymethyl ethylenediamine | 4.5 g. |
| Bis-(β-aminoethyl)sulfide | 0.12 g. |
| Polyethylene glycol (M.W. 4000) | 2.7 g. |
| N-phenethyl-α-picolinium bromide | 15.3 g. |
| 4-hydroxypyrazolo(3,4d)pyrimidine | 0.49 g. |
| 2-methylimidazole | 3.57 g. |
| 6-bromo-5-methyl-4-azabenzimidazole | 0.72 g. |
| Colloidal silica (30% solids) | 5.55 g. |

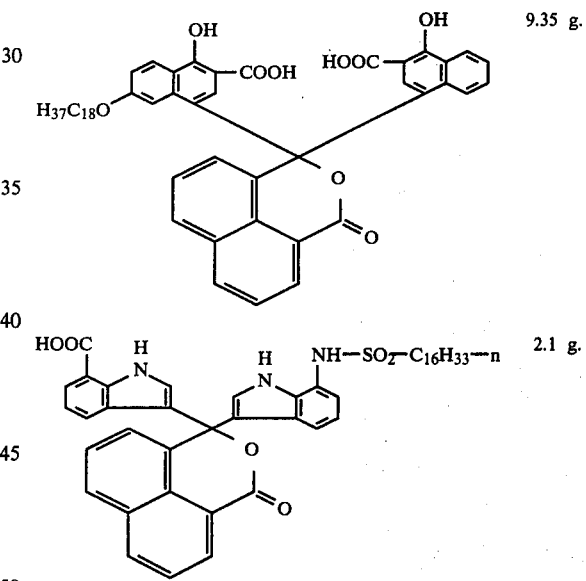

A portion of the processing composition was encased in a rupturable container comprising a marginal seal. The rupturable container was fixedly mounted transverse the leading edge of a multicolor diffusion transfer film unit comprising a negative component and positive component in a superposed relationship. Such diffusion transfer film units are well known and are described in, for example, U.S. Pat. No. 3,415,644. The rupturable container was subjected to a compressive force by passage between a pair of pressure rollers in known manner to effect rupture of the marginal seal and spreading of the processing composition between the aforesaid negative and positive components, thereby effecting color image formation in the film unit. The processing composition spread evenly and uniformly such that a high quality positive color image was obtained. The respective negative and positive components were retained in a superposed relationship subsequent to the completion of processing.

Since certain changes may be made in the above-described process without departing from the invention herein involved, it is intended that all matter contained in the above description shall be interpreted as illustrative and not in a limiting sense.

What is claimed is:

1. A process for preparing a polymeric oxime comprising the steps of providing a solution of a monomeric oxime in an aqueous acidic solvent system, said monomeric oxime being of the formula

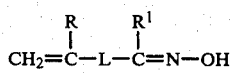

wherein R is hydrogen or lower alkyl, $R^1$ is hydrogen, lower alkyl, aryl, aralkyl, or alkaryl, and L is a divalent organic linking group which is stable under the conditions of said process and which does not deleteriously affect the conduct of said process, said solution having a pH of up to about 1.5; and polymerizing said monomeric oxime dissolved in said aqueous acidic solvent system in the presence of an aqueous acid-soluble polymerization initiating agent.

2. A process of claim 1 wherein said pH of said solution is below pH 1.0.

3. A process of claim 1 wherein said solvent system comprises a mineral acid.

4. A process of claim 3 wherein said mineral acid is selected from the group consisting of hydrochloric acid, sulfuric acid, and nitric acid.

5. A process of claim 1 wherein the ratio by weight of said monomeric oxime to said aqueous acidic solvent system is within the range of about 1:1 to about 1:50.

6. A process of claim 5 wherein said ratio is within the range of about 1:2 to about 1:10.

7. A process of claim 1 wherein said monomeric oxime is polymerized at a temperature within the range of about 0° C. to about 70° C.

8. A process of claim 7 wherein said monomeric oxime is polymerized at a temperature within the range of about 20° C. to about 40° C.

9. A process of claim 1 wherein said polymerization initiating agent comprises a redox initiator combination.

10. A process of claim 9 wherein said redox initiator combination comprises ferrous sulfate and ammonium persulfate.

11. A process of claim 1 further comprising the step of upwardly adjusting, subsequent to completion of said polymerizing of said monomeric oxime, said pH of said solution to a level within the range of about 0.5 to about 2.0.

12. A process of claim 1 further comprising the step of upwardly adjusting, subsequent to completion of said polymerizing of said monomeric oxime, the pH of said solution to a level sufficient to effect formation of a precipitate of said polymeric oxime.

13. A process of claim 1 further comprising the step of upwardly adjusting, subsequent to completion of said polymerizing of said monomeric oxime, the environmental pH of said polymeric oxime to a level at which hydrolysis of the oxime function of said polymeric oxime is essentially non-occurring.

14. A process of claim 13 wherein said environmental pH is adjusted to a level above 6.0.

15. A process of claim 1 wherein an ethylenically unsaturated copolymerizable comonomer is dissolved in said aqueous acidic solvent system containing said monomeric oxime.

16. A process of claim 15 wherein said ethylenically unsaturated copolymerizable comononer is also a monomeric oxime.

17. A process of claim 15 wherein said ethylenically unsaturated copolymerizable comonomer is a non-oxime comonomer.

18. A process of claim 17 wherein said comonomer is acrylic acid.

19. A process of claim 1 wherein said divalent organic linking group is selected from the group consisting of arylene, arylenealkylene, and

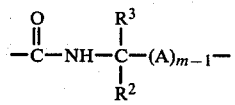

wherein each of $R^2$ and $R^3$ is independently hydrogen or lower alkyl having from 1 to 6 carbon atoms, A is alkylene, arylene, or arylenealkylene, and m is an integer 1 or 2.

20. A process of claim 19 wherein said monomeric oxime is of the formula

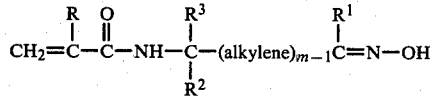

wherein each of $R^2$ and $R^3$ is independently lower alkyl having 1 to 6 carbon atoms; the alkylene moiety has 1 to 8 carbon atoms; R is hydrogen or lower alkyl; $R^1$ is hydrogen, lower alkyl, aryl, aralkyl, or alkaryl; and m is an integer 1 or 2.

21. A process of claim 20 wherein said monomeric oxime is diacetone acrylamide oxime.

22. A process of claim 21 wherein said solution has a measured pH of about 0.4.

23. A process of claim 22 further comprising the step of upwardly adjusting, subsequent to completion of said polymerizing of said monomeric oxime, the pH of said solution to a level sufficient to effect formation of a precipitate of said polymeric oxime.

24. A process of claim 23 further comprising the step of upwardly adjusting the environmental pH of said precipitate to a level at which hydrolysis of the oxime function of said polymeric oxime is essentially non-occurring.

25. A process of claim 21 wherein said polymerization initiating agent comprises a redox initiator combination.

26. A process of claim 25 wherein said redox initiator combination comprises ferrous sulfate and ammonium persulfate.

27. A process of claim 26 wherein diacetone acrylamide oxime is polymerized at a temperature within the range of about 20° C. to 40° C.

28. A process of claim 21 wherein said diacetone acrylamide oxime is copolymerized with acrylic acid.

29. A process of claim 28 wherein said solution has a measured pH of about 0.4.

30. A process of claim 29 further comprising the step of upwardly adjusting, subsequent to completion of said polymerizing of said monomeric oxime, the pH of said solution to a level sufficient to effect formation of a precipitate of said polymeric oxime.

31. A process of claim 30 further comprising the step of upwardly adjusting the environmental pH of said precipitate to a level at which hydrolysis of the oxime function of said polymeric oxime is essentially non-occurring.

* * * * *